Feb. 12, 1952     W. J. DONNELLY     2,585,751
NAVIGATING INSTRUMENT
Filed Feb. 16, 1948     2 SHEETS—SHEET 1
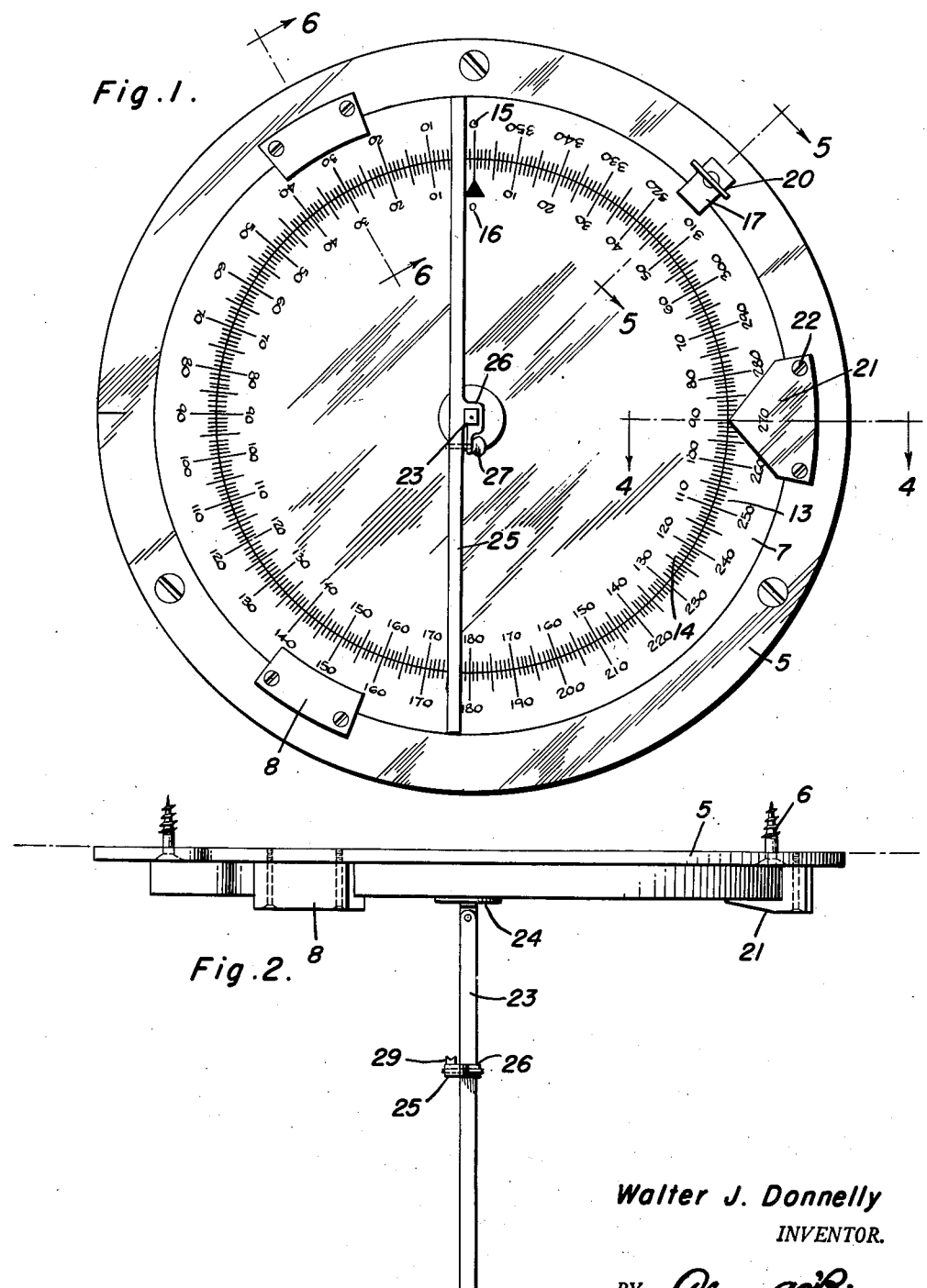
Walter J. Donnelly
*INVENTOR.*

Feb. 12, 1952     W. J. DONNELLY     2,585,751
NAVIGATING INSTRUMENT
Filed Feb. 16, 1948     2 SHEETS—SHEET 2
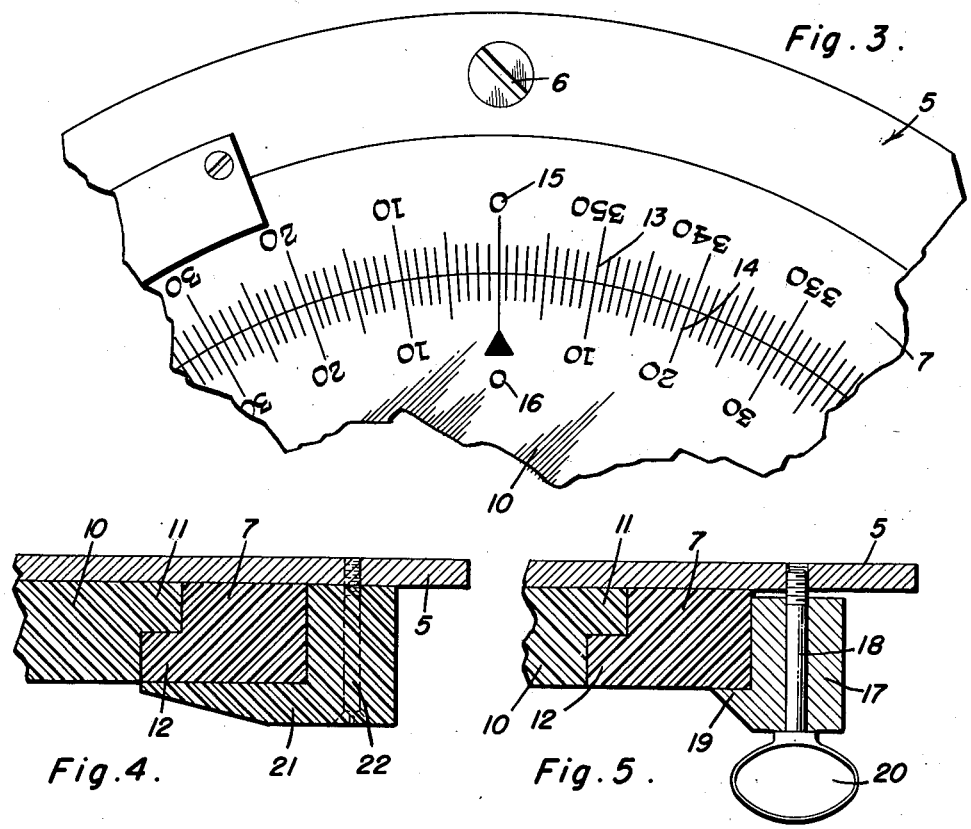
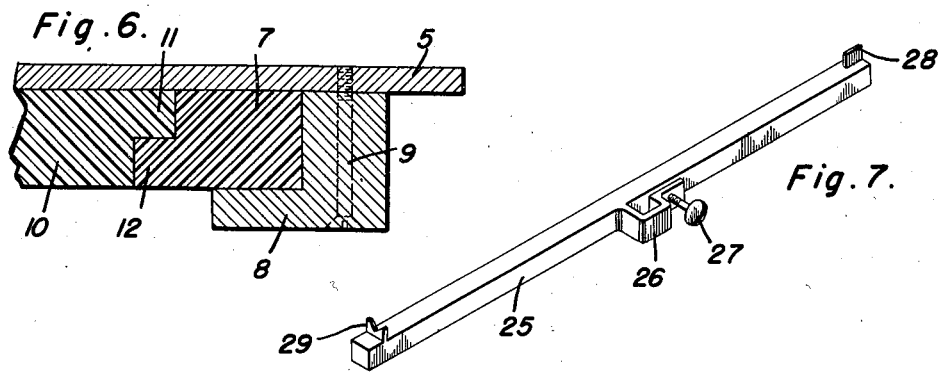
Walter J. Donnelly
INVENTOR.

Patented Feb. 12, 1952

2,585,751

UNITED STATES PATENT OFFICE 2,585,751

NAVIGATING INSTRUMENT

Walter J. Donnelly, Baldwin, N. Y.

Application February 16, 1948, Serial No. 8,568

4 Claims. (Cl. 33—72)

1

The present invention relates generally to new and useful improvements in navigating instruments and more particularly to a bearing finder for obtaining the necessary direction in degrees for plotting one's position from a particular point that can be recognized and is shown on the map or chart.

An important object of the invention is to provide an instrument of this character including the provision of a pair of concentrically arranged scales mounted in a horizontal position to a suitable supporting structure, such as the ceiling of a cabin or on the deck or other flat surface of a ship and including a rotatable scale and a relatively fixed scale and providing a sighting element carried by the rotatable scale for sighting a known object whereby the plot one's position as indicated on the rotatable scale with respect to the fixed scale which has been set to correspond with a compass reading.

A further object of this invention is to provide a perpendicular supporting shaft for the sighting element which is foldable against the rotatable scale, when not in use and mounting the sighting element for vertical adjustment on the shaft.

A still further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of the instrument;

Figure 2 is a side elevational view showing the manner of supporting the instrument to an overhead structure;

Figure 3 is an enlarged fragmentary plan view of the inner and outer concentric scales;

Figures 4, 5 and 6 are fragmentary sectional views taken respectively on the lines 4—4, 5—5 and 6—6 of Figure 1, and Figure 7 is a perspective view of the sighting rod.

Referring now to the drawings in detail wherein for the purpose of illustration I have disclosed a preferred embodiment of the invention, the numeral 5 designates an attaching plate provided with screws or other fastening devices 6 by means of which the plate may be secured to an overhead supporting structure, such as the ceiling of a cabin or the like as indicated in Figure 2 of the drawings, or for securing the plate on the surface of a deck or other flat supporting structure.

A ring 7 is rotatably mounted against the exposed surface of attaching plate 5 by L-shaped hangers 8 secured to the attaching plate by screws or the like 9 and a disc 10 is likewise positioned against the exposed surface of attaching plate 5 within ring 7.

The adjacent edges of ring 7 and disc 10 are rabbeted to provide a flange 11 on the periphery of disc 10 overlying a flange 12 formed on the inner periphery of ring 7 to thus rotatably support the disc within the ring.

The surface of ring 7 is provided at its inner edge with an outer annular scale 13 and the surface of disc 10 at its outer edge is provided with an inner annular scale 14.

The scale 13 is graduated in degrees in one direction from a zero setting 15 to three hundred and sixty degrees and the scale 14 is graduated oppositely in degrees from a zero setting 16 to one hundred and eighty degrees.

A locking lug 17 is mounted on a bolt 18 threaded in the attaching plate 5 and provided with a shoulder 19 bearing against the surface of ring 7, the bolt being provided with a wing head 20 for clamping the lug against the ring to secure the ring in a stationary position.

A pointer 21 of transparent material is also secured to the attaching plate 5 by screws 22, the pointer projecting inwardly of the surface of ring 7 into an indicating position at the adjacent edges of both of the scales 13 and 14.

A square shaft 23 is pivoted at one end to the center of disc 10 by means of an attaching bracket 24 for folding against the disc.

A sighting bar 25 is provided with a clamping guide 26 intermediate its ends for clamping the bar in a vertically adjusted horizontal position on shaft 23 by a set screw 27. Front and rear sights 28 and 29 are carried at the ends of bar 25.

In the operation of the device, with the attaching plate 5 secured to an overhead supporting structure as indicated at 30 in Figure 2, the shaft 23 is suspended from the center of the disk 10 in a perpendicular position.

The scale 13 carried by ring 7 is set in accordance with the reading of a compass (not shown) and locked by lug 17. The course of the ship is held steady and sighting bar 25 is turned to align sights 28 and 29 on a known object from which a bearing is wanted. Bearing as per ship's compass can then be read on scale 13 as indicated by the pointer 16 on scale 14. Scale 14 is used for taking bearings relative to the ship's heading from zero degrees at "dead ahead" to 180° right or left at the stern without any adjustment or use of scale 13. The object to be sighted is aligned over sights 28 and 29 and the bearing is read positively on scale 14 at the pointer on 21.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A navigating instrument comprising a flat stationary member and a flat rotatable member positioned centrally in confronting relation one upon the other, a scale on one member and a pointer on the other member coacting with the scale, said stationary member forming an attaching plate for securing either under or on top of a supporting structure to expose the scale and pointer in either an upwardly or downwardly facing position, and a tightening device including a perpendicular handle having one end secured to the center of the rotatable member, a sighting bar having front and rear sights, and means reversibly securing the sighting bar in position on the handle to maintain the front and rear sights uppermost in accordance with the reversal of the instrument.

2. A navigating instrument comprising a flat annular plate, one or more concentric calibrated members rotatably carried at one surface of the plate, a pointer carried by the plate coacting with at least one of the calibrated members, means selectively securing the plate to either an overhead or underneath supporting structure in a position to expose the calibrations and pointer in a downwardly or upwardly facing position, and a sighting device including a perpendicular handle having one end secured to the center of the innermost rotatable member, a sighting bar having front and rear sights, and means reversibly securing the sighting bar in position on the handle to maintain the front and rear sights uppermost in accordance with the reversal of the instrument.

3. A navigating instrument comprising a flat stationary member and a flat rotatable member positioned centrally in confronting relation one upon the other, a scale on one member and a pointer on the other member coacting with the scale, said stationary member forming an attaching plate for securing either under or on top of a supporting structure to expose the scale and pointer in either an upwardly or downwardly facing position and a sighting device including a perpendicular handle having one end secured to the center of the rotatable member, a sighting bar having front and rear sights, and a clamp carried by the sighting bar reversibly securing the sighting bar in position on the handle to maintain the front and rear sights uppermost in accordance with the reversal of the instrument.

4. A navigating instrument comprising a flat annular plate, one or more concentric calibrated members rotatably carried at one surface of the plate, a pointer carried by the plate coacting with at least one of the calibrated members, means selectively securing the plate to either an overhead or underneath supporting structure in a position to expose the calibrations and pointer in a downwardly or upwardly facing position, means locking the outermost calibrated member to the plate, and a sighting device including a perpendicular handle having one end secured to the center of the exposed surface of the innermost calibrated member, a sighting bar having front and rear sights, and means reversibly securing the sighting bar in position on the handle to maintain the front and rear sights uppermost in accordance with the reversal of the instrument.

WALTER J. DONNELLY.

REFERENCES CITED

The following references are of record in the file of this patent:

UNITED STATES PATENTS

| Number | Name | Date |
| --- | --- | --- |
| 293,013 | Hand | Feb. 5, 1884 |
| 628,600 | Fields | July 11, 1889 |
| 731,751 | Burgess | June 23, 1903 |
| 978,093 | Weule | Dec. 6, 1910 |
| 1,240,525 | Woodward | Sept. 18, 1917 |
| 1,794,964 | Knutson | Mar. 3, 1931 |
| 1,830,345 | Anderson | Nov. 3, 1931 |
| 2,217,224 | Ionides | Oct. 8, 1940 |
| 2,411,306 | Van Goosbeek | Nov. 19, 1946 |